（12）United States Patent
Stieff et al.

(10) Patent No.: US 8,153,959 B1
(45) Date of Patent: Apr. 10, 2012

(54) MEASUREMENT OF UNDISTURBED RADON GROUND SURFACE FLUX USING A PASSIVE RADON SURFACE FLUX MONITOR

(75) Inventors: Lorin R. Stieff, Sarasota, FL (US); Frederick Stieff, Leesburg, VA (US)

(73) Assignee: Rad Elec Inc., Frederick, MD (US)

( * ) Notice: Subject to any disclaimer, the term of this patent is extended or adjusted under 35 U.S.C. 154(b) by 714 days.

(21) Appl. No.: 12/287,523

(22) Filed: Oct. 10, 2008

Related U.S. Application Data

(60) Provisional application No. 60/998,365, filed on Oct. 10, 2007, provisional application No. 61/002,501, filed on Nov. 9, 2007.

(51) Int. Cl.
    *G01V 5/00* (2006.01)
(52) U.S. Cl. ........................................... 250/253
(58) Field of Classification Search ............ 250/253
    See application file for complete search history.

(56) References Cited

U.S. PATENT DOCUMENTS

| | | | | |
|---|---|---|---|---|
| 4,814,608 | A * | 3/1989 | Dempsey et al. | 250/253 |
| 4,926,053 | A * | 5/1990 | Dempsey et al. | 250/376 |
| 4,992,658 | A * | 2/1991 | Ramsey et al. | 250/253 |
| 5,055,674 | A * | 10/1991 | Kotrappa | 250/255 |
| 5,093,570 | A * | 3/1992 | Dorfi et al. | 250/253 |
| 2007/0190655 | A1* | 8/2007 | Yanagisawa et al. | 436/38 |

OTHER PUBLICATIONS

Monnin et al., "An automatic radon probe for earth science studies," Mar. 1998, Journal of Applied Geophysics, vol. 39, pp. 209-220.*
Rechcigl et al., "A Preliminary Comparison of Radon Surface Flux measurement using large area activated charcoal canisters (LAACC) and electret ion (EIC)," 1997, International Radon Symposium, pp. 3.1-3.11.*
Stieff et al., "Passive E-Perm Radon flux monitors for measuring undisturbed radon flux from the ground," 1996, International Radon Symposium, pp. 1.1-1.6.*

\* cited by examiner

*Primary Examiner* — David Porta
*Assistant Examiner* — Christine Sung
(74) *Attorney, Agent, or Firm* — James Creighton Wray

(57) ABSTRACT

A passive radon surface flux monitor has a dome with an open base having a radial flange and a top opening where an electret can be threaded. Attached to and extending below the open base of the dome is a metal collar that supports the dome when placed on the ground. The collar holds a conductive screen against the radial flange. The conductive screen permits diffusion of gas including radon, thoron, and their daughter products into the dome. A thin paper diaphragm on the conductive screen prevents dust from entering the dome. Sealant seals the connection of the collar, screen, flange, and diaphragm to prevent lateral loss of radon. A collar is pressed partially into the ground at a suitable site and an electret is threaded into the top opening. After a time, the electret is removed and its change in voltage measured.

24 Claims, 4 Drawing Sheets

MEASUREMENT OF UNDISTURBED RADON GROUND SURFACE FLUX USING A PASSIVE RADON SURFACE FLUX MONITOR

This application claims the benefit of U.S. Provisional Application Nos. 60/998,365 and 61/002,501, filed Oct. 10, 2007 and Nov. 9, 2007, respectively, which are hereby incorporated by reference in their entirety.

BACKGROUND OF THE INVENTION

Radon ground surface flux can be measured to evaluate potential building sites or to explore for deposits.

Needs exist for improved apparatus and methods of measuring undisturbed radon ground surface flux.

SUMMARY OF THE INVENTION

Exploration for deposits and evaluation of potential building sites based on measurement of gaseous daughter products is accomplished by trapping the gas in a laterally confined space above ground and diffusing the gas from the ground into that space and through a metal screen into a chamber during a time sufficient to establish an equilibrium of gas flux in the ground and in the gas content in the space and in the chamber. The location of the chamber is established with a GPS device. Changes of condition of the gas above the screen in the chamber over a length of time are noted and recorded to provide a measurement of ground gas surface flux and an indication of target deposits.

A gas sensitive device in the chamber is exposed to the gas during a time, which is recorded.

The gas sensitive device is then evaluated for gas exposure over the time period.

In one embodiment the gas sensitive device is removed from the chamber, encapsulated and later evaluated.

In one embodiment the gas is a decay daughter product of a radioactive mineral. The sensitive device is a device which records the decay of the gaseous daughter product. The sensitive device changes condition upon encountering decay products of the gas, such as alpha particles.

One such radioactive gas sensitive device is an E-Prom™ electret manufactured and sold by Rad Elec Inc. (REI) of Frederick, Md., USA.

In one embodiment, a hemispherical dome about 3 inches high and about 6 inches in diameter is supported above the ground on a cylindrical stainless steel 1½ inch collar. The collar holds a grounded metal screen against a radial flange on the bottom of a chamber-forming dome. A gas diffusion-permitting dust-banning diaphragm may be added beneath the screen. The collar, screen, flange and diaphragm are sealed to prevent lateral loss of gas. Gas freely flows through the grounded screen, which prevents passage of charge-bearing ions. The lower portion of the collar is positioned in a ½-1 inch deep circular groove in the ground, holding the screen and the dome flange about ½ to one inch above the ground. Equilibrium between the gas in the dome and the ground surface flux of the gas is reached in about 15-30 minutes. A spent sensitive device holder is removed from the dome. A charged sensitive device is removed from a case and mounted in the dome in place of the removed holder. The time of mounting the charge on the device and the location are recorded, the latter usually using a GPS device. The dome is left on the ground during a fractional period of daylight hours, so as to avoid condensation. Then the sensitive device is detached and encased, and the spent device holder or seal is replaced on the dome. The time of removal, charge of the device and location are noted. The dome and collar are removed from the groove for relocating and reusing the following day.

Upon returning to the laboratory the encased devices are studied for their exposure to radioactive gas, and the levels of activity recorded by the sensitive devices and their locations are recorded and plotted to indicate possible locations of targeted ore deposits.

Hemispherical domes have upper centered sensor connections and open circular bottoms with grounded metal screens and diffusion diaphragms. Any containers and shapes may be used which are capable of holding gas and exposing gas to the sensors over known or reasonably estimated periods of time. Shapes of the containers and positions of the sensors may be taken into consideration when evaluating the exposed sensors and logging results.

Temperatures within the containers may vary. When temperatures are important, devices may be augmented with maximum temperature recorders. The domes may be made of reflective materials or may be coated or covered with reflective materials to reduce or avoid buildup of temperatures within the domes.

Use of the prospecting domes within daylight hours prevents internal temperatures falling below dew points and forming condensation which may skew results.

The groove in the ground is formed without producing dust by pressing the collar into the ground. Twisting and pressing or stepping on a plate which mounts a similar collar may perform the groove. The plate may be a board, and the groove former may be a cylindrical collar with flanges attached to the board. The cylindrical collar has the same diameter as the collar on the dome but has only one half of the dome collar's height.

Between the ground and the domes, grounded metal screen or other conductive porous screens cover the open bottom of the domes. Diaphragms are employed to reduce or eliminate unwanted passage of dust particles into the domes. Tyvek material, which is commonly used to wrap frame houses or any material, including paper towel material, may be used as an inexpensive diaphragm to allow the diffusion of gas through the diaphragm to establish the desired equilibrium of gases in the dome, in the collar-enclosed space below the diaphragm and metal screen and in the gaseous flux in the ground.

Measurements of the pCi/m2/sec rate at which radon diffuses from the surface of the soil into the atmosphere, the radon surface flux, are potentially of value to both the uranium and building industries. The invention provides a radon surface flux monitor with a metal screen on an open bottom in a passive method using electret ion technology. The 960 ml hemispheric chamber of the passive flux monitor has a threaded opening at its top, which permits the threading of an electret in the top of the hemisphere. In addition, the open base of the chamber hemisphere is covered with a grounded metal screen. The screen and the radon/thoron diffusion diaphragm permit the radon, half-life 3.8229 days, from the soil to diffuse into the ion chamber. Radon gas molecules decay, producing ions which are attracted to the charged electret. Measured discharge of the electret indicates radon flux near the ground surface. If the thoron surface flux is very strong, there is the possibility that thoron, half-life 54.5 sec can also diffuse into the ion chamber.

The radon flux unit, pCi/m2/sec, requires a specifically defined area in square meters of the ground where the radon flux is being measured. This requirement is met by a circular, stainless steel collar connected to the bottom flange of a hemispheric monitor. When the 6 inch diameter 1½ inch deep collar on the flux monitor is pressed into the ground, the collar clearly defines the area of the ground being measured. The stainless steel collar grounds the metal screen and minimizes lateral loss of radon. To minimize any loss of radon from the monitor, the area of contact between the stainless steel collar, the screen and the diffusion diaphragm is sealed with a silicone sealant applied to the interior circumference of the collar. This step insures that the radon in the collar-enclosed volume does not escape. If rain occurs during the exposure period, at least the area being measured would initially be protected, and water could not enter the ion chamber. To obtain the most meaningful radon surface flux measurements, the disturbance of the surface of the ground where the measurement is to be made should be held to a minimum.

In the selection of the site for the deployment of the flux monitor, it is important that the small area selected should have as minimum a disturbance of the surface soil as possible. Any objects in the selected site that could damage or puncture the exposed diffusion diaphragm, such as sharp stones or under growth should be removed. Significant disturbance of the near surface soil would result in at least some loss of the near surface interstitial soil radon. The relatively short exposure times, 2 to 8 hours, for the radon surface flux measurement usually is not sufficient to permit the recovery of all of the lost near surface radon. The loss of such potentially useful data in areas where the radon flux levels associated with mineralization are low can and should be avoided.

Measurement sites where standing water is present are not suitable for flux measurements. A flux measurement at a site where the surface soil is moist, following a rain, would yield lower flux measurements than a day later when the surface soil moisture levels are lower. The flux monitor minimizes actual entry of water into the ion chamber when soil moisture is high.

After the selection and clearing of the site, the site is prepared for the flux monitor by cutting a circular groove in the soil during the field deployment of the monitors. The actual radon flux monitors may be used to cut the deployment grooves in the soil. The deployment grooves may be cut using separate similar but shorter stainless steel collars attached to a plate or board. The cutting collars have the same diameter as the flux monitor collars. Tabs or flanges on the collars are attached by screws to a 1 to 1½ inch thick, 12 inch×9 inch wooden board. The board/collar assembly is used to make the initial cylindrical cuts in the ground. The board is rotated by hand, and the cutting collar is pressed into the ground. In difficult cases the board can be stepped upon. A groove approximately ½ to 1 inch deep is usually sufficient. The board limits the depth of the groove. The bottom half of the collar on the flux monitor is then pressed into the groove made in the soil. In many cases the groove is formed by pressing the collar on the monitor into the ground. To insure correct depth, a ridge or mark is formed externally on the collar.

The soil within the groove remains undisturbed. The shallow groove positions the base of the chamber and the diffusion diaphragm about ½ to 1" above the surface of the soil.

A fully discharged spent electret holder is always kept threaded in the flux monitor, whether in storage or transit to minimize entry of dust, insects or moisture into the ion chamber. This discharged electret holder is removed and replaced by a charged electret when initiating a flux measurement in the field. The discharged electret holder, which acts as a cover or seal, is usually stored in a zip-lock plastic bag and is kept in the field with the deployed flux monitor during exposure.

The discharged electret holder is replaced in the monitor after the live electret holder has been removed and encased before relocating the monitor.

When starting the radon measurement, a charge electret is threaded into the flux monitor. The serial number of the electret, its initial voltage, the field location of the monitor, the date and the time are noted in a field notebook or a shoulder mounted field computer. Generally, even for relatively low soil radon flux levels, a daytime exposure of 2 to 8 hours will result in a minimum drop in the voltage of the electret of approximately 10 to 20 volts. A voltage drop of 20 volts is sufficient for a useful radon flux measurement. However, in areas where radon surface flux levels are high, significantly shorter exposure times should be anticipated. Field experience for each specific locality is the best guide in optimizing exposure times and delta voltages.

At the conclusion of the exposure period, the exposed electret is removed from the flux monitor, inspected and immediately capped or encased. The electret serial number and time of termination of the exposure are to be noted in the notebook or computer. The previously removed discharged electret holder is re-threaded into the flux monitor to keep its interior clean and dust and moisture free. In general, the final voltage reading of the electret should be made promptly after return to the base camp or office.

If, during the exposure period the flux monitor was exposed to rain, the electret should be carefully inspected for the presence of very small water droplets on the surface on the electret. If present, the electret should be handled with care, kept horizontal (if possible), and allowed a short period for the droplets to evaporate. A field notebook or computer entry should be made of the presence of the droplets.

Several factors influence the measurements of radon surface flux rates. Changes in the moisture content of the soil can significantly alter radon surface flux rates. Radon dissolves in water layers that cover individual soil grains and in the interstitial water between the grains. The rate of radon diffusion is reduced as interstitial water increases. After a rain, the moisture content of the near surface soil is increased. Duplicate flux measurements made at the same location after periods of rain have been found to be lower. For example, flux measurements made approximately nine to twelve hours after a light rain which deposited approximately ½ in. of water were found to vary from approximately 15% to almost 50% lower than flux measurements made at the same site just before the rain. Conversely, sustained periods without rain can be expected to result in rising radon surface flux rates.

The movement of radon from depth in the soil towards the surface is a function of several factors. The profile of moisture in the soil as function of depth is critical, as are the physical properties of the soil itself. If the radon flux rate is higher than the rate which can be attributed to the normal parts per million concentrations of uranium and thorium found in rocks, minerals and soils, clearly the presence of radon's immediate parent, Ra, from some other source must be in motion and present at depth. For example, the movement of radon just by diffusion is driven by the difference in the radon concentration at depth and the radon concentration in the surface soil at the soil/air interface. Some of the radon in transit to the surface will decay; radon's half life is 3.8229 days. The radon concentration gradient also becomes steeper as it approaches the surface. In addition to diffusion, the transport of radon from depth to the surface can also be enhanced by the upward movement of soil moisture and other soil gases towards the air/soil interface. The ambient atmospheric concentration of radon even near the surface of the ground is usually low. The radon flux from the ground mixes very rapidly with the radon in the ambient air.

A second area where soil moisture can present measurement problems is related to the deployment of flux monitors for exposure periods which include overnight measurements. The monitors' diffusion diaphragms are relatively transparent to water vapor. During a night time deployment of the monitors, the night time drop in ambient air temperature can results in condensation on the inner walls of the monitor and on the surface of the electret. This has been observed even in areas where soil moisture is very low. It is suggested that flux measurements be made during daylight hours. At such times, air temperatures are higher, and the flux monitors are warmed by direct exposure to sunlight. Under these conditions, the condensation of water vapor on the inner surface of flux monitors and the electrets has not been observed. Water droplets on the surface of the electret can result in additional voltage losses which are not related to the decay of radon. Usually, it is difficult to evaluate the loss of electret voltage due to condensation of droplets on the surface of the electret during an exposure.

Radon flux measurements should not be initiated if local weather forecasts include the strong possibility of rain. If, however, deployed flux monitors are overtaken by rain, the data often can be recovered as long as the Teflon surface of the electret can be kept dry. The flux monitor limits the intrusion of water into the ion chamber. It is recommended that the monitor with electret in place be taken to the base camp or office before removing the electret. At the base camp or office, the monitor is dried, and the electret is examined for condensation of water droplets on the electret as well as the inner surfaces of the ion chambers. Any small water droplets on the electret should be allowed to evaporate before the final voltage measurement is made. The inner surface of the ion chamber, if wet, should be dried before redeployment.

The performance of the passive radon surface flux monitors is also influenced by factors that are directly related to the rate at which the radon from the ground passes through the diffusion diaphragm into the ion chamber. In general, depending on the type of diffusion diaphragm in use and the radon flux rate, the length of time varies before concentrations of the radon inside the ion chamber approach the concentrations of the radon trapped in the air between the collar and the monitor's diaphragm. This process results in a form of equilibrium, where the radon concentrations on both sides of the diaphragm approach equal values. Typically, at the beginning of a flux measurement, both the radon concentration of the air in the ion chamber and of the air between the soil and the diffusion diaphragm of the monitor would be the same as the radon concentrations in the ambient air. Depending on the radon surface flux rates, the radon concentration in the volume between the soil and the monitor diaphragm can increase rapidly. When the radon surface flux rates are high, the radon gradient across the diaphragm is strong, and values close to an equilibrium radon concentration usually develop within 2 to 4 hours. However, where radon flux rates are low and approach the levels of the ambient atmospheric radon concentration in the ion chamber, the radon concentration gradient across the diaphragm will be weak. In this case, equilibrium between the radon concentration in the ion chamber and final radon concentrations in the volume between the soil and the monitor diaphragm may require as much as 6 to 8 hours. More transparent diffusion diaphragms offer the user a choice of radon equilibrium times and the time it takes to make useful radon surface flux measurements in the field.

Thoron, or thoron emanation, the noble gas (Ern) isotope of $86Rn220$, has a half life of 54.5 sec. and is the immediate daughter of radium, $88Ra224$, in the $90Th232$ decay chain. This half life can be compared to the half life of the noble gas isotope, radon, $86Rn222$, the immediate daughter product of radium, in the decay chain, with a half life of 3.8229 days. The ratio of the half lives of the two noble gas isotopes, 3.8229 days/54.5 sec. is 6060.5/1. Although thorium normally is more abundant in geologic materials than uranium, the very large difference in the half lives of these two noble gas isotopes severely limits depth of the source of the thoron in the soil which is able to diffuse to a surface to 10 to 20 cm. At greater depths, the thoron decays to its non-gaseous daughter products before it can reach the surface of the soil. The maximum diffusion depth for radon is in meters.

For thoron even to enter the monitors ion chamber once it reaches the surface, its residence time in the volume between the surface and the grounded screen and the diffusion diaphragm must be very short. Finally, this very short lived noble gas isotope must pass through the grounded screen and the diffusion diaphragm into the ion chamber, a process which may exceed the remaining available time. However, the modified flux monitor has the potential to provided the user with a selection of diffusion diaphragms with different diffusion constants. More transparent diffusion diaphragms may permit a quantitative evaluation of the thoron factor. In general, corrections for the drop in voltage due to thoron decay would be expected to be very small compared to the voltage drop due to even low radon surface flux rates.

A direct consequence of daylight measurement of radon surface flux is that the direct exposure of unprotected hemispheres of the monitors to full sunlight can result in making some hemispheres almost too hot to touch. Surface temperatures in excess of 130 degrees F. have been measured. Electrets so exposed to full sunlight are also warm or hot to the touch. The final electret voltage measurement should not be made until the electret has returned to ambient air temperature. The data on the effect of this temperature rise on the performance of the ion chamber is difficult to establish. Clearly, the pressure inside the hemisphere increases, because the leakage rate of the air in the ion chamber through the some monitor diaphragms are very low. A white plastic hemisphere placed over the black hemisphere substantially reduces the solar heating effect.

Radon flux monitors also respond both to the radon in the ambient atmosphere and the background gamma radiation. It is important to establish for the survey area, at the beginning of the field session, the level of the ambient atmospheric radon and the gamma background at the surface of the soil. At a minimum, these measurements should be repeated every week during the field session. The gamma background at the soil surface can be measured with portable instrumentation. The ambient atmospheric radon measurements can be made with a chamber. For adequate chamber voltage drops, ambient atmospheric radon and gamma measurement normally requires two to three days depending on the atmospheric radon levels. Even for relatively low radon surface flux rates, normal radon surface flux measurements typically require only 2 to 8 hours. For such relatively short exposure periods, combined delta volts corrections for both the background radon and gamma are usually relatively small and are sometimes ignored by users. However, if it becomes important to use all of the available Information in areas where a suspected radon signal from an ore deposit might be weak, corrections for the ambient atmospheric radon and soil gamma background levels could be useful.

The invention provides a method for radon exploration including forming a groove in the ground placing a bottom portion of a collar in the groove supporting grounded metal screen and a diffusion diaphragm on a top of the collar, spacing the screen and the diffusion diaphragm from the ground with the collar and isolating a space within the screen diffusion diaphragm and an interior of the collar. A chamber is supported on the top of the screen, diaphragm and collar above the grounded metal screen. A radon decay measuring device is supported in a top of the diffusion chamber. Leaving the collar, diffusion diaphragm, chamber and radon decay measuring device in place during at least a fraction of daylight hours establishes an equilibrium of radon flux in the chamber and in the space between the diffusion diaphragm and the ground. Removing and encasing the radon measuring device and later measuring changes in the radon measuring device provides an induction of surface radon flux for the exploration.

The groove formed in the ground with a similar collar one half of a height of the collar which mounts the diaphragm and chamber. The groove forming collar has a depth stop. The depth stop extends across the top of the forming collar. The depth stop is a board on which the groove forming collar is mounted.

One radon diffusing diaphragm is a foraminous screen.

One radon diffusing diaphragm is a gas slowing diffusing barrier for reducing through a flow of a gas having a relatively short decay half life. One radon diffusing diaphragm is a foraminous film.

The new method initially allowing ambient surface gases to diffuse into an interior of the dome before positioning the collar in the groove is the ground.

Radon exploration uses a diffusion dome, having an open base and a hemispherical top. The top has a top opening. An electret is mounted in the top opening. A cylindrical collar extends downward from the base. The collar has a top for joining with the base and has a bottom for positioning in the ground being explored. A diffusion screen extends across the base and across the top of the collar. A seal extends around the base, the diffusion screen and the top of the collar to prevent lateral movement of surface gases.

A new passive ground surface gas flux monitor includes a chamber having a known volume with an open base and an opening where a gas sensor can be attached. A collar is connected to the open base and extends below the circumference of the open base and supports the chamber when placed on the ground. A formainous layer is connected to the collar above the ground. This collar clearly defines an area of ground being measured when the collar is pressed into the ground.

The chamber may be a dome, the foraminous layer may be a conductive screen mounted between the collar and the dome, and the collar may be made of a conductive material. The conductive screen permits diffusion of radon, thoron, and their daughter products into the dome. There may also be a thin paper diaphragm adjacent the conductive screen. The dome may also include a radial flange on its open base and the collar may hold the conductive screen against the radial flange. A sealant may seal the collar, flange, and peripheral edges of the screen and the diaphragm.

The gas sensor may be a radon decay measuring device. The radon decay measuring device may be an electrets in an electrets holder which is connected to the opening. The dome may be made of reflective material or coated or covered with reflective material to reduce a solar heating effect. There may also be a maximum temperature recorder connected to the chamber.

In a new method of measuring ground surface gas flux a ground surface gas flux monitor is provided. The ground surface gas flux monitor includes a chamber of known volume, which chamber has an open base and an opening remote from the base where a gas sensor can be attached, and a collar extending below the circumference of the open base of the chamber and a foraminous element supported by the collar. The ground surface gas flux monitor is positioned so that a lower portion of the collar is in the ground and an upper portion of the collar supports the dome above the ground, a gas sensor is mounted in the opening, the gas sensor is exposed in the chamber, and the ground surface gas flux monitor is left on the ground.

In providing a ground surface gas flux monitor the chamber may be a dome and a spent gas sensor or a seal may be provided in the opening. In this case, equilibrium is achieved between gas in the dome and a ground surface gas flux, the spent gas sensor or seal is removed from the opening, and an active gas sensor is mounted in the opening. The time of mounting the active gas sensor and the location of the ground surface gas flux monitor are recorded. The gas sensor is exposed to an interior of the dome and after waiting the exposed gas sensor is removed, the time of removing the exposed gas sensor is recorded, the exposed element gas sensor is measured, and the measurement of the gas sensor is recorded.

The positioning the ground surface gas flux monitor and the removing the exposed gas sensor may be done during daylight hours of a single day to avoid condensation within the dome. In providing a ground surface gas flux monitor with a foraminous element, a conductive screen may be provided attached to the open base that permits diffusion of gas within the collar into the dome. In positioning the ground surface gas flux monitor, the collar may be pressed into the ground. A groove may be formed in the ground by pressing or stepping on a depth stop on which a second collar is mounted, in which case in positioning the ground surface gas flux monitor the collar is placed into the groove formed in the ground.

A thin paper diaphragm may be provided on the foraminous element and a site may be selected for measurement to minimize presence of moisture and objects that could damage or puncture the diaphragm and any objects that could damage or puncture the diaphragm may be removed from the site. The exposed gas sensor may be inspected and capped or replaced after it is removed from the opening and a spent gas sensor or seal may be mounted in the opening. The charged gas sensor may be inspected after it is removed for the presence of water droplets on its surface and the charged gas sensor may be kept horizontal and allowed a short period for the droplets to evaporate when such droplets are discovered. A diffusion diaphragm with a predetermined diffusion constant may be selected and provided near the conductive screen on the ground surface gas flux monitor. The temperature of the charged gas sensor may be measured and allowed to return to ambient air temperature before taking a final measurement of the gas sensor. The level of ambient atmospheric radon and the gamma background at the surface of the soil may be measured.

In providing a ground surface gas flux monitor, a charged gas sensor may be provided in the opening, the time of positioning the ground surface gas flux monitor and the location of the gas surface flux monitor recorded, the charged gas sensor removed, the time of removing the charged gas sensor recorded, the change in charge on the charged gas sensor measured, and the change in charge on the charged gas sensor recorded. The difference in charge between initial and final voltage readings of the gas sensor may be determined, this difference divided by the exposure time in hours, and this value used as a measure of surface flux.

A new passive radon surface flux monitor includes a hemispherical dome having an open base, a top threaded opening where an electret can be threaded, and a radial flange on its open base. A cylindrical metal collar is connected to the open base and extends below the circumference of the open base of the dome and supports the dome when placed on the ground. A conductive screen is attached to the open base and a diaphragm is adjacent the conductive screen. Sealant seals the collar, flange, and peripheral edges of the screen and diaphragm. The collar holds the conductive screen against the radial flange, and the conductive screen permits diffusion of ground surface gas including radon, thoron, and their daughter products into the dome.

These and further and other objects and features of the invention are apparent in the disclosure, which includes the above and ongoing written specification, with the drawings.

DETAILED DESCRIPTION OF THE PREFERRED EMBODIMENTS

Figure 1:
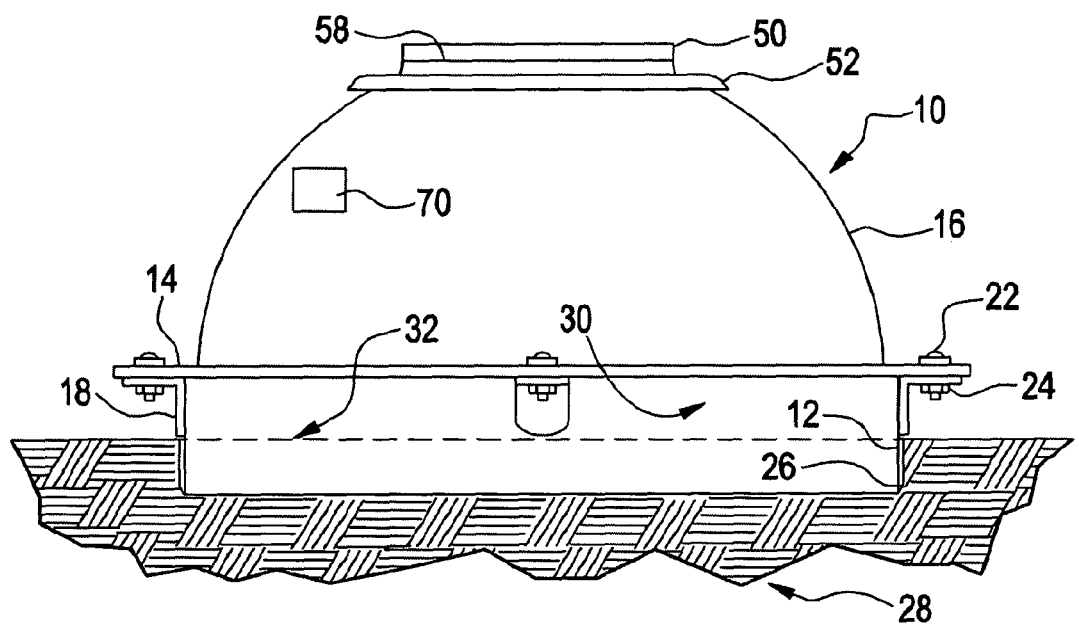
FIG. 1 is a side elevation of a monitor dome in the ground.

FIG. 1 shows a domed chamber 10. Cylinder 12 extends downward from a flange 14 formed on the dome 16. L-shaped lugs 18 are spot welded to the steel cylinder 12. Screws 22 and nuts 24 connect the cylinder 12 to the flange 14. The cylinder 12 is placed in a groove 26 in the ground 28 to provide a space 30 for collecting gas which is released from the ground area 32 within the cylinder 12. Temperature recorder 70 can be used to account for temperature variation within the chamber 10. Receiver 52 delimits opening 58 in the top of the chamber.

Figure 2:
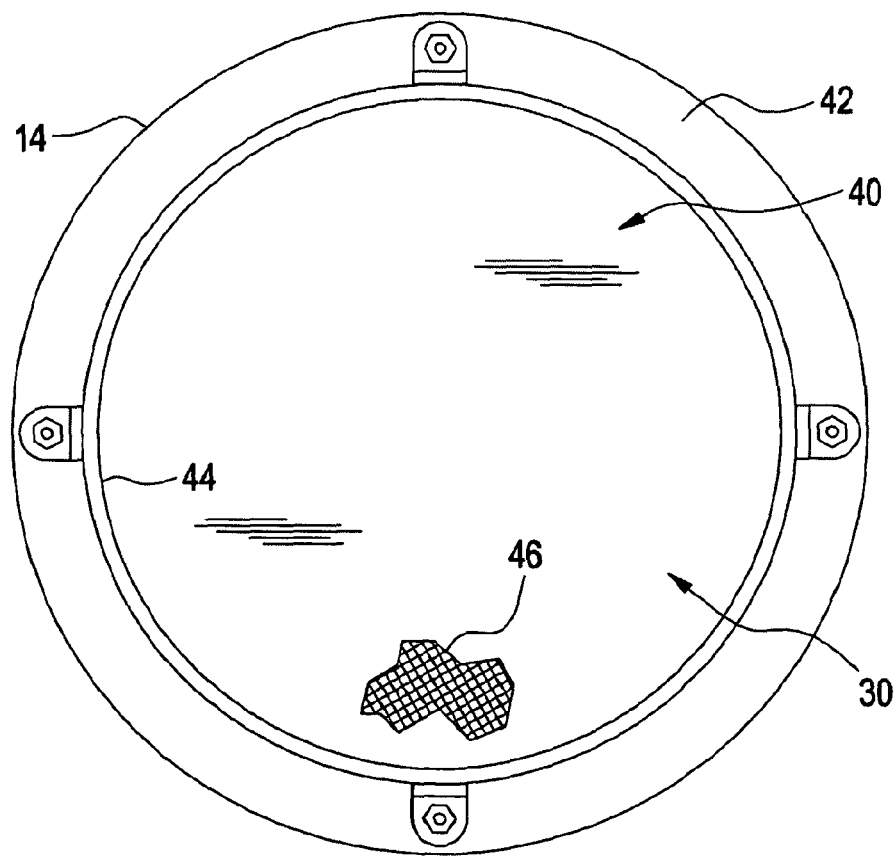
FIG. 2 is a bottom view of the monitor shown in FIG. 1.

As shown in FIG. 2, the open bottom of dome 16 is covered with a disc-shaped diaphragm 40 having an annular edge 42 which extends over and is secured to the bottom of flange 14. The cutaway shows the metal screen 46 above the diaphragm.

To prevent outward flow of gas from space 30, a seal 44 is formed inside of the intersection 46 of the diaphragm 40 and the cylinder 12.

When the chamber 10 is supported above the ground by the cylinder 12 embedded in the groove 26 in the ground 28, diaphragm 40 allows gas in space 30 to flow through the diaphragm until equilibrium is achieved with concentrations of gases in space 30 and in the interior of dome 16.

Figure 3:
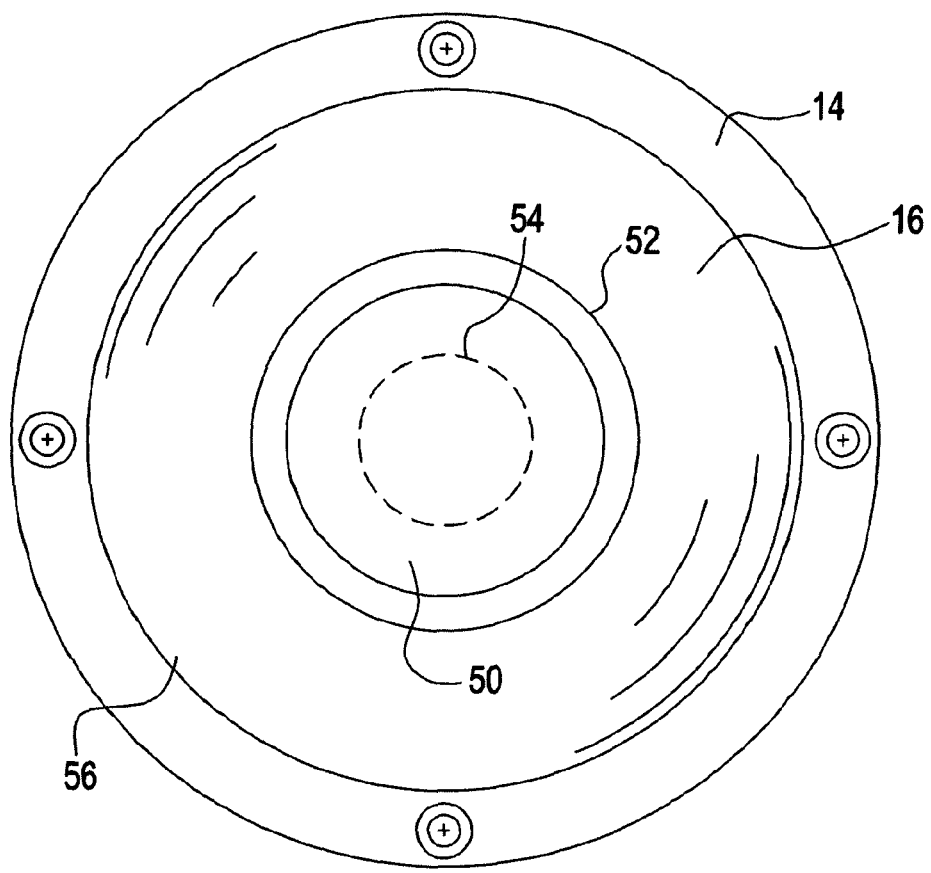
FIG. 3 is a top view of the monitor shown in FIGS. 1 and 2.

As shown in FIG. 3 a gas sensor holder 50 is mounted in a receiver 52 formed in the top of the dome. The dome has a base 56 which is open. The sensor 54 in holder 50 is affected by the targeted gas within the dome, that is in equilibrium with the same gas in space 30. In this case the targeted gas is radon and the sensor 54 is an electret which initially is charged. The charge is reduced over time by alpha ray impacts as the radon decays.

Figure 4:
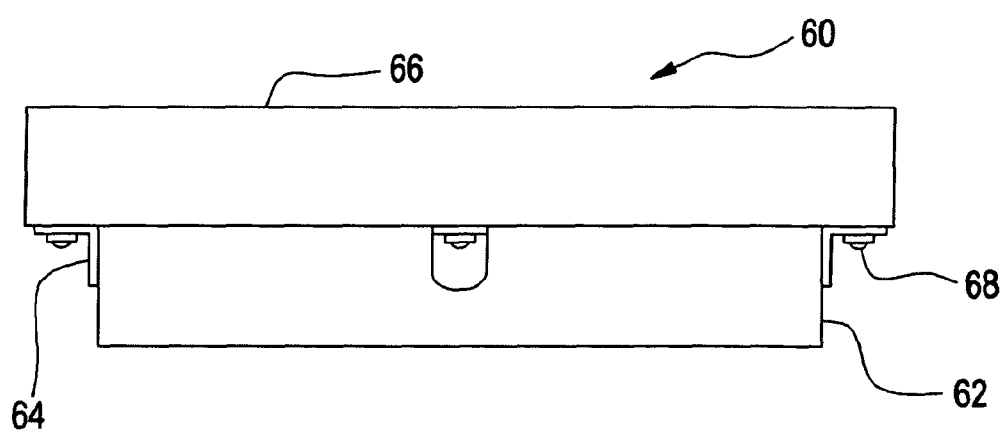
FIG. 4 is a side elevation of a cylindrical cutter attached to a board for forming a groove in the ground.

It is important that the soil in space 30 not be disturbed. The groove 26 is formed by a tool 60 shown in FIG. 4 which includes a groove-forming cylinder 62 of the same diameter as cylinder 12 but of approximately half its height.

The cylinder 62 is attached to a board 66 with lugs 64. Lugs 64 are spot welded to the outside of forming cylinder 62 and are attached to the board with wood screws 68.

A dummy holder remains in place of holder 50 until the cylinder 12 is placed in the ground. Then the dummy holder is removed by unscrewing it into the receiver 52.

The real holder 50 is encased and screwed into the receiver. The identification, initial voltage level and location of the sensor are logged.

The dome and cylinder are left in place for an approximate time. The real holder is removed and encased or covered, and its identification, the time and the location are logged.

The dummy holder is screwed into the receiver and the dome 16 and cylinder 10 are lifted from the ground for transporting to a new location. The holder is returned to the office or lab for evaluation and reading of its voltage.

Figure 5:
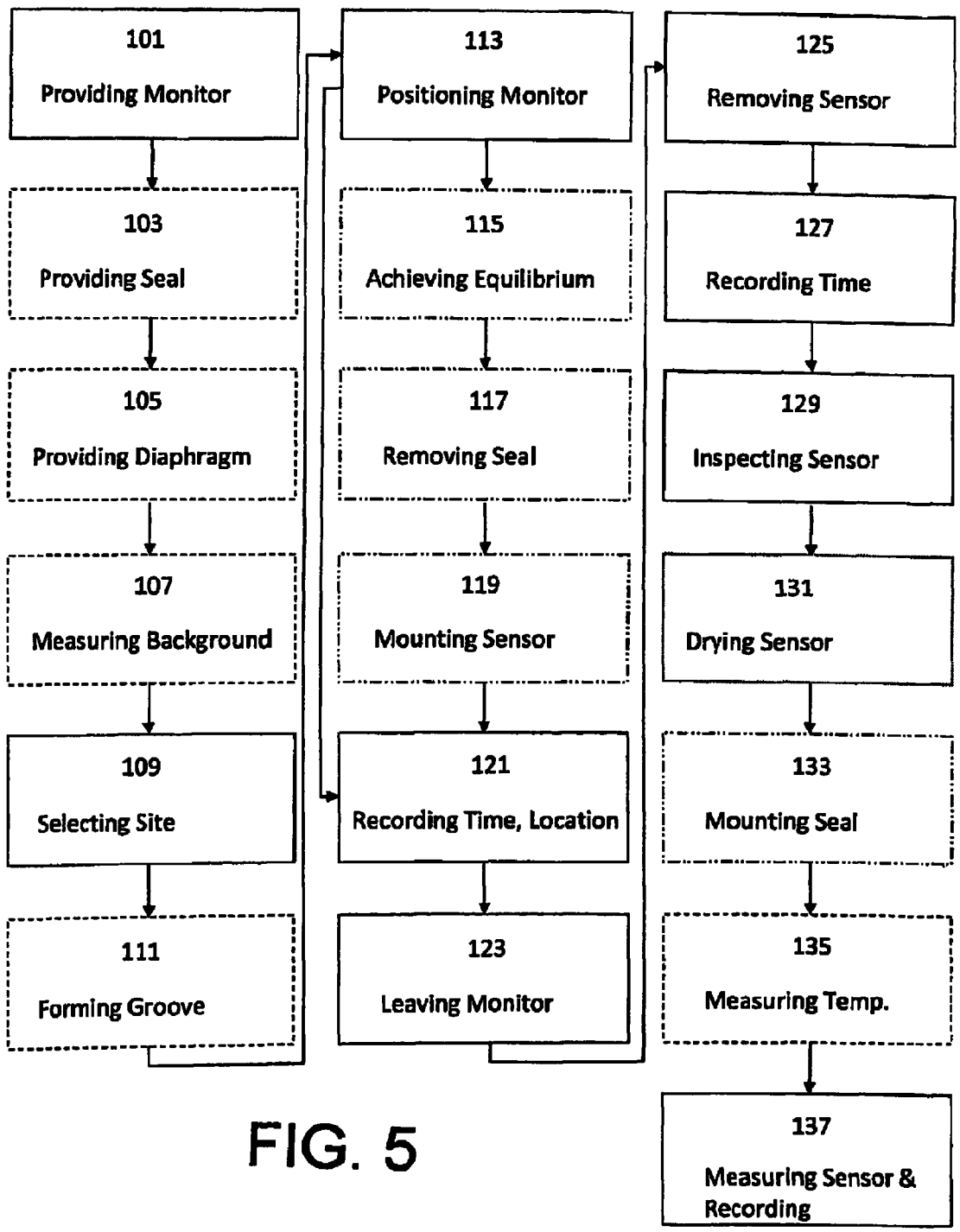
FIG. 5 is a diagram illustrating a gas ground surface flux measurement method.

One embodiment of a gas ground surface flux measuring method is illustrated in FIG. 5. A ground surface gas flux monitor is provided 101. Dashed boxes indicate optional actions. The ground surface gas flux monitor may be provided with a spent gas sensor or seal 103 and a diaphragm 105. The level of ambient atmospheric radon and the gamma background at the surface of the soil may be measured 107. A site is selected for measurement, avoiding moisture and loose objects, and any objects that could damage a diaphragm are removed 109. A groove may be formed in the ground by means of a tool with a depth stop and collar 111. The monitor is positioned in a groove in the ground 113.

If a seal or spent gas sensor has been provided, the monitor is allowed to sit until equilibrium has been achieved between gas in the dome and a ground surface gas flux 115, and then the seal or spent gas sensor is removed 117 and an active gas sensor 119 is mounted. The time when the gas sensor begins measuring and the location of the measurement are recorded 121. The monitor is left in position for a time 123 and then the sensor is removed 125 and the time is recorded 127. The sensor is inspected 129, and if wet, is kept horizontal and allowed to dry 131. If a seal or spent gas sensor was initially provided, one is again mounted in the monitor 133. If temperature is a concern, the temperature of the gas sensor is measured and the gas sensor will be allowed to return to ambient air temperature 135. The gas sensor is measured and recorded 137. The above actions are not necessarily performed in the order shown.

Figure 6:
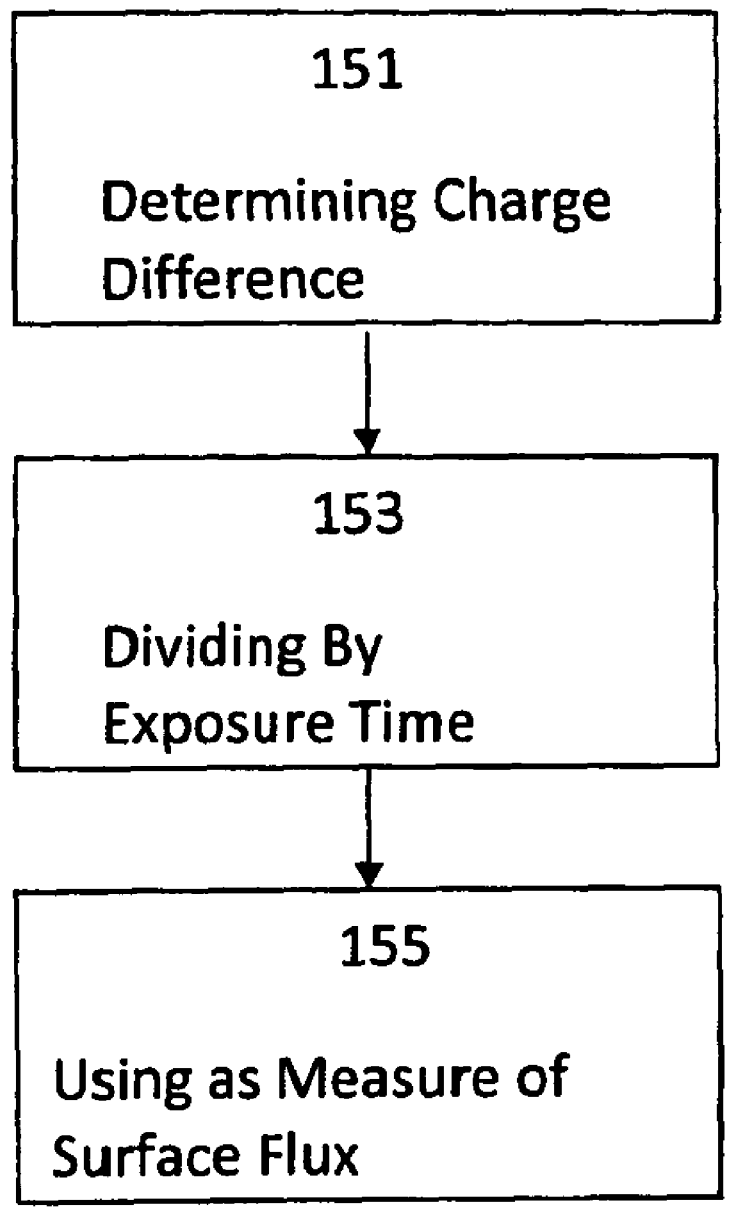
FIG. 6 is a diagram illustrating a method of analyzing gathered data.

FIG. 6 illustrates further actions that can be taken to analyze the data gathered. The difference between the initial and final charge readings is determined 151. This value is divided by the exposure time of the sensor 153. This value is then used as a measure of surface flux 155.

The electret chamber is a passive integrating ionization monitor having a stable electret mounted inside a small chamber made of plastic. The electret, a charged Teflon disk, serves as both a source of the electrostatic field and as a sensor. Radon gas passively diffuses into the chamber. Alpha particles emitted by the radon decay process ionize air molecules. Ions produced inside the chamber are collected onto the electret, causing a reduction of its surface charge. The reduction in charge is a function of the total ionization during a specific monitoring period and the specific chamber volume. This change in voltage is measured with Rad Elec's SPER-1 or SPER-2 Electret Voltage Readers.

Measurements of the $pCi/m^2/sec$ rate at which radon diffuses from the surface of the soil into the atmosphere, the radon surface flux, are potentially of value to both the uranium and building industries.

In one embodiment the passive flux monitor has a 960 mL, hemispheric chamber for measuring radon in air. The chamber permits the threading of an electret in the top of the hemisphere. An open base of the chamber hemisphere has a 6 inch diameter aluminum wire screen, which is grounded by attachment to a ground in planing metal collar. The grounded screen establishes the limit of the electrostatic field created by the electret.

A cylindrical, stainless steel collar attached to the bottom flange of the hemispheric monitor establishes a specifically defined area in sq. m. of the ground selected for the radon flux measurement. The flux monitor collar pressed into the ground clearly defines the area of the ground being measured.

The aluminum screen may be replaced by a conductive material which is radon permeable.

A diffusion diaphragm of paper, Tyvek or other radon permeable material may be placed below the screen to prevent entry of dust or dirt.

To eliminate any loss of radon radially from the monitor collar, the point of contact between the stainless steel collar and the diffusion diaphragm covering the open base of the flux monitor is sealed with a silicone sealant. This sealant is applied to the interior circumference of the collar to insure that the radon in the enclosed volume of air does not escape. In addition, if rain occurs during the exposure period, at least the area being measured would initially be protected and the entry of water into the ion chamber would be held to a minimum.

Several alternative diffusion diaphragms are transparent to radon. The aluminum screen permits essentially unimpeded diffusion of the radon, thoron (if present) and their daughter products into the ion chamber. Diffusion diaphragms of uncoated Tyvek™ or thin paper are placed on the exposed, under side of the metal screen and held in place with a piece of circular tubing which fits tightly against the inner surface of the metal collar.

Monitor deployment protocol should be a function of the diffusion diaphragm used. To optimize the measurement of radon surface flux rates and to improve the reproducibility of such measurements, the deployment protocols specify that the monitors be initially deployed with spent electrets threaded into the monitors. The purpose of this step is to provide time for the level of the radon concentration in the ion chamber to approximately equal the rapidly rising level of the radon in the air between the surface of the ground and the diffusion diaphragm i.e. to approach a level of radon concentration equilibrium in the monitor. This equilibrium time varies from a little less than ½ hour to approximately 2 hours and is both a function of the diffusion diaphragm used and the radon surface flux rates. As the radon concentration in these flux monitors approach a state of equilibrium, the radon surface flux rates appears to approaches zero and the radon concentration in the near surface soil increases and begin to approach the monitor equilibrium value.

To obtain the most meaningful radon surface flux measurements, the disturbance of the surface of the ground where the measurement was to be made should be held to a minimum. The area defined by the collar is approximately 0.2 sq. m. The deployment of the flux monitor involves an absolute minimum disturbance of the selected site.

In the selection of the site for the deployment of the radon flux monitor, it is important that the small area selected should require as minimum a disturbance of the surface soil as possible. Any objects in the selected site that could damage or puncture the exposed diffusion diaphragm such as sharp stones or undergrowth must be removed. Significant disturbance of the near surface soil will result in, at least, some loss of the near surface, interstitial soil radon. The relatively short exposure times, 1 to 4 hours, for the radon surface flux measurement usually is not sufficient to permit the recovery of all of this lost radon. The loss of such potentially useful data results in areas where the radon flux levels associated with mineralization are low.

In general, monitor site selection can and should be modified as field conditions dictate. It is better to select an off grid site where a reliable measurement can be obtained than a grid station that happens to be within a wet area. Measurement sites for radon surface flux that are swampy, water-saturated or where standing water is present should be skirted around or avoided altogether. Such sites are not suitable for flux measurements. However, data on the radon concentration in the water at such sites may be of interest as well as in the water from springs and streams. REI has developed instrumentation for making such radon-in-water measurements. A flux measurement at a site following a rain, will yield lower flux rates measurements than a day later when the surface soil moisture levels are lower.

After the selection and clearing of the site, the site is prepared for the flux monitor by cutting in the soil a circular groove. The collar of the radon flux monitors can be used to cut this deployment groove in the soil during the field deployment of the monitors. It should be done with care, so as not to damage the monitor or puncture the diaphragm. Monitors with the metal screens are less likely to be damaged during this deployment process. Alternatively, the deployment groove can be cut using a separate stainless steel collar. This collar has the same diameter as the flux monitor collar and is attached by screws to a 1 to 1½ inch thick, 9×9 inch wooden board. This board is rotated by hand and pressed into the ground. In difficult cases the board can be stepped upon. A groove approximately ½ to 1 inch deep is usually sufficient. The flux monitor is then pressed into this groove made in the soil.

The following protocol is suggested for flux monitors with diffusion diaphragms.

a. Deploy in the morning all of the flux monitors with spent electrets in place for the day's survey. This initiates the procedure of establishing equilibriums conditions in the ion chambers of all of the monitors before the flux measurement begin.

b. In the early afternoon, the spent electret at station 1 is removed and a measured electret is promptly threaded into the monitor. The serial number of the electret, initial voltage, field-location of the monitor, date and time are noted on a prepared field form or in a field notebook. As the discharged electret holder must also be kept free from dust it is usually kept in the field with the deployed flux monitor during exposure in a zip-lock bag. The field team then moves to station 2 and repeats the process until all of the deployed monitors have received measured electrets. After all monitors have received measured electrets, the field staff returns to station 1.

c. Approximately two hours after the first electret was installed, the measured electret at station 1 is removed and capped. The serial number of the electret, field-location of the monitor, date and time are noted on a prepared field form or in a field notebook. The spent electret is rethreaded in the monitor, and the monitor is readied for the next days survey.

d. At the base camp or office, the final voltage readings of the electrets are made promptly, and the data entered in the field form or field notebook, This protocol offers the possibility that by approaching an equilibrium condition prior to the start of the flux measurement, a relatively uniform exposure time of approximately two hours will yield flux measurements that can be compared over a wide range of radon surface flux rates and, generally are reproducible if flux measurements are repeated at the same station.

The immediate threading of the measured electret into the flux monitor following pressing the monitor into the soil, the original protocol, usually will require longer exposure times, 2 to 6 hours. The geology of the area, available staff and other factors may dictate this protocol. If it does, it should be remembered that at the start of the measurement both the ion chamber and the air trapped by the collar will have radon concentrations at the level of the ambient atmosphere. The resulting delta volts will be an average of the radon concentration over a relatively long equilibration time. The time required to establish an equilibrium radon concentration in the ion chamber will depend on the radon surface flux rate and could exceed 2 hours.

The following protocol is suggested for flux monitors with metal screen diaphragms.

a. Depending on the exploration schedule, field conditions, approximately half of the monitors scheduled for that day are deployed in the morning. At station 1, the flux monitor is pressed into the soil, the fully discharged electret holder is removed and a measured electret is threaded into the monitor. The serial number of the electret, initial voltage, field location of the monitor, date and time are noted on a prepared field form or in a field notebook. As the discharged electret holder must also be kept free from dust it is usually kept in the field with the deployed flux monitor during exposure in a zip-lock bag. The field team then moves to station 2 and repeats the process until all of the monitors to be deployed have received measured electrets. This deployment should not take more than 2 hours. Equilibration with metal screen diaphragm is rapid and an exposure period of 1 to 2 hours should be sufficient to make reproducible radon flux rate measurements.

b. If between 1 and 2 hours have elapsed since the start of the morning's deployment, the field staff returns to station 1, the exposed electret is removed from the flux monitor, inspected for dust and immediately capped. The electret serial number and time of termination of the exposure are noted on the field form or in a field notebook. The discharged electret holder is re-threaded into the flux monitor, and the flux monitor is prepared for the afternoon deployment. The field team then moves to station 2 and repeats the process station by station until all of the deployed measured electrets have been recovered and the spent electrets have been threaded into the flux monitors.

c. At the base camp or office, the final voltage reading of the electrets is made promptly and the data entered in the field form or field notebook.

d. In the afternoon, the second half of the days scheduled monitor deployment is initiated. If between 1 and 2 hours have elapsed since the start of the afternoon's deployment, the field staff returns to the station 1, the exposed electret is removed from the flux monitor, inspected for dust and immediately capped. The electret serial number and time of termination of the exposure are noted on the field form or in a field notebook. The discharged electret holder is re-threaded into the flux monitor and the flux monitor is prepared for tomorrow's deployment. The field team then moves to the next station and repeats the process station by station until all of the deployed measured electrets have been recovered and the spent electrets have been threaded into the flux monitors.

e. After all of the exposed electrets have been recovered, the field staff returns to the base camp or office. There, in the order of the deployment, the final voltage reading of each exposed electret is made and the data entered in the field forms or field notebook. It is important to recognize that this monitor with a metal screen diaphragm has not been calibrated at a recognized radon surface flux facility. The calibration factor (CF) used with the carbon coated Tyvek™ diaphragm cannot be use to calculate the radon surface flux rate with a metal screen monitor. However, the difference in voltage between the initial and final voltage readings (DV) of the monitor's electret divided by the exposure time in hours (DT) is a useful measure of the surface flux. Data from different monitors can be directly compared. This DV/hr value cam be further improved by dividing it by the Linearity Correction Coefficient, (LCC).

If the equilibrium deployment protocol described above is followed, a daytime exposure of 1 to 2 hours usually will result in a minimum drop in the voltage of the electret of approximately 10 to 20 volts even for relatively low soil radon flux rates. A voltage drop of 20 volts is sufficient for a useful radon flux measurement. However, in areas where radon surface flux levels are higher, either significantly shorter exposure times should be anticipated or much larger voltage drops will be observed. Field experience for each specific locality is the best guide in optimizing exposure times and delta voltages.

If during the exposure period the flux monitor was exposed to rain, it is suggested that at the end of the exposure, the electret be inspected for the presence of water droplets on the electret. If present, the capped electret should be handled with care and kept horizontal, if possible. An entry should be made of the presence of the droplets. At the base camp or office, the droplets on the surface of the electret should be allowed to evaporate with the cap in place before any voltage measurement is made. In general, the final voltage reading of the electret should be made promptly after return to the base camp or office.

The following equations for the calculation of radon surface flux are presented:

The Calibration Factor, CF, for short term electrets is:

$$CF = 10.4 \pm 1.0 \text{ VPH per unit flux}(pCi/m^2/sec) \times LCC \quad (1)$$

Where the Linearity Correction Coefficient, LCC, is:

$$LCC = 0.7727 + 0.0004568 \times (I+F)/2 \quad (2)$$

$$\text{Delta Volts} = \text{Initial Voltage}(I) \text{ minus Final Voltage}(F) \quad (3)$$

$$\text{Mid Point Voltage, MPV,} = (I+F)/2. \quad (4)$$

$$\text{Radon Flux}(pCi/m^2/sec) = (DV/hr)/(CF) = (DV/h)/(10.4 * LCC) \quad (5)$$

FIELD FORM EXAMPLE

| Serial_No | Location | Start Time | Initial Volts | End Time |
|---|---|---|---|---|
| SZ3865 | A12345 | 9:58 AM | 537 | 12:03 PM |

| Serial_No | Final Volts | Delta Volts | Delta Time | MPV | LCC |
|---|---|---|---|---|---|
| SZ3865 | 504 | 33 | 2.08 | 520.5 | 1.010464 |

| Serial_No | CF | Volts/hr | | VPH/LCC | Rn Flux |
|---|---|---|---|---|---|
| SZ3865 | 10.50883 | 15.8400 | | 15.67596 | 1.507 |

It is the practice of some field parties to use the uncorrected delta volts (DV) as a measure of the radon surface flux rate. However, because of the ion collection efficiency of an electric ion chamber is a function of its mid point voltage (MPV), it is recommended that the DV be divided by the Linearity Correction Coefficient, LCC. If this is done the corrected DVs can be directly compared. Failure to make this correction can result in errors of 10 to almost 20 percent.

The suggested deployment protocol for the monitor given below is based on the concept of equilibrium times. Typically, upon deployment of these monitors in the field, the radon concentrations both in the air volume defined by the collar and the diffusion diaphragm and in the ion chamber of the monitor are the same as the radon concentration of the ambient air. However, once the monitor is deployed, the radon concentration of the air within the collar can build up relatively rapidly, depending on the radon surface flux rate. Even though this early radon concentration gradient across the diaphragm can be steep, the rate of diffusion of the radon through the diaphragm into the ion chamber appears to be relatively slow.

The radon concentration in the monitor with the metal screen reached equilibrium relatively quickly. The rate of diffusion of radon through the diffusion diaphragm is slower. In the beginning of the exposure for these monitors, some of the radon daughter products formed in the volume between the soil surface and the metal screen will move into the ion chamber. Once equilibrium is established, however, the differences in the concentrations of these radon daughter products in the volume between the soil and the metal screen and in the ion chamber disappear.

It is possible to make some quantitative estimates of the response of different diffusion diaphragms if the data from the flux monitor is treated as if it were a standard chamber. For three of the field stations in the current study, the calculated measurements of the radon concentration are after an exposure of approximately 19 minutes respectively: 32.9 pCi/L, 13.9 pCi/l, and 38.0 pCi/L assuming a surface gamma background correction of 14 uR/h. The precision of these measurements is limited because the difference between the initial and final voltage measurements, the delta volts, are below 10 volts. In spite of this limitation, it is useful to compare this data to the measurements obtained for the flux monitors equipped with metal screen diaphragms. For these monitors, the radon concentrations for the same three stations after approximately 18 minutes are, respectively: 70.1 pCi/L, 69.5 pCi/L and 76.4 pCi/L, again assuming a surface gamma background correction of 14 mR/h.

Changes in the moisture content of the soil can significantly alter radon surface flux rates. Radon does dissolve in the water layers that cover individual soil grains and in the interstitial water between the grains. The rate of radon diffusion is reduced as this interstitial water increases. Clearly, after a rain, the moisture content of the near surface soil is increased and duplicate flux measurements made at the same location have been found after periods of rain to be lower. For example, flux measurements made approximately nine to twelve hours after a light rain which deposited approximately ½ in. of water were found to be approximately 15% to almost 50% lower than flux measurements made at the same site just before the rain. Conversely, sustained periods without rain can be expected to result in rising radon surface flux rates.

The movement of radon from depth in the soil towards the surface is a function of several factors. As has been mentioned, the profile of moisture in the soil as function of depth is critical as are the physical properties of the soil itself. If the radon flux rate is to be higher than the rate which can be attributed to the normal parts per million concentrations of uranium and thorium found in rocks, minerals and soils, clearly the presence of radon's immediate parent, $_{88}Ra^{224}$, from some other source must be in motion and present at depth. For example, the movement of radon just by diffusion is driven by the difference in the radon concentration at depth and the radon concentration in the surface soil at the soil/air interface. Some of the radon in transit to the surface will decay. Radon's half life is 3.8227 days. The radon concentration gradient also becomes steeper as it approaches the surface. In addition to diffusion, the transport of radon from depth to the surface can also be enhanced by the upward movement of soil moisture, helium (alpha particles) from the decay of uranium and its daughter products, and other soil gases which move towards the air/soil interface. The ambient atmospheric concentration of radon even near the surface of the ground is usually low and the radon flux from the ground mixes very rapidly with the radon in the ambient air.

A second area where soil moisture can directly effect the measurements of the radon flux is related to the deployment of flux monitors for exposure periods which include overnight measurements. The monitors' diffusion diaphragms are relatively transparent to water vapor. During a night time deployment of the monitors, the nighttime drop in ambient air temperature in the monitor can result in condensation of water droplets on the inner walls of the ion chamber and on the surface of the electret. This has been observed even in areas where soil moisture is very low. It is strongly suggested that flux measurements be made during daylight hours. At such times, air temperatures are higher and the flux monitors are warmed by direct exposure to sunlight. Under these conditions, the condensation of water vapor on the inner surface of flux monitors and the electrets has not been observed. As mentioned, water droplets on the surface of the electret can result in additional voltage losses which are not related to the decay of radon. Usually, it is difficult to evaluate such losses of electret voltage due to condensation of droplets on the surface of the electret during an exposure.

Radon flux measurements should not be initiated if local weather forecasts include the strong possibility of rain. If, however, deployed flux monitors are overtaken by rain, the data often can be recovered as long as the Teflon surface of the electret can be kept dry. The flux monitor limits the intrusion of water into the ion chamber. If droplets are observed on the electret, it is recommended that the capped electret be taken to the base camp or office as carefully as possible. At the base camp or office, electret holder may be gently warmed and the droplets on the electret allowed to evaporate before making a voltage measurement. The inner surface of the ion chamber, if wet, should be dried before redeployment.

The deployment time for reproducible radon surface flux measurements using the modified monitor is directly related to the process of reaching a form of equilibrium with the radon concentrations on both sides of the diffusion diaphragm beginning to approach equal values. If a flux monitor is taken from stock and pressed into the soil, at the beginning of the flux measurement, both the radon concentration of the air in the ion chamber and the air between the soil and the diffusion diaphragm of the monitor will be the same as the radon concentration in the ambient atmosphere. Depending on the diffusion diaphragm used and the radon surface flux rates, the equilibrium radon concentration in the ion chamber can increase rapidly.

When radon flux rates are low and approach the levels of the ambient atmospheric radon concentration in the ion chamber, the radon concentration gradient across the diaphragm is weak. In this case, equilibrium between the radon concentration in the ion chamber and final radon concentrations in the volume between the soil and the monitor diaphragm may require 2 or more hours.

The deployment time will depend on the diffusion diaphragm used in the field. If just the metal screen is used, equilibrium times are short, and useful reproducible measurements can be made in 1 hour. Measurements are currently in process to evaluate several radon transparent diffusion diaphragms which will offer the geologist in the field a choice of radon equilibrium times and the time it takes to make reproducible radon surface flux measurements in the field.

Thoron, the noble gas (Em) isotope, $_{86}Rn^{220}$, has a half life of 54.5 sec. and is the immediate daughter of radium, $_{88}Ra^{224}$, in the $_{90}Th^{232}$ decay chain. This half life can be compared to the half life of it noble gas isotope, radon, $_{86}Rn^{222}$, the immediate daughter product of radium, $_{88}Ra^{226}$ in the $_{92}U^{238}$ decay chain with a half life of 3.8229 days. The ratio in seconds of the half lives of the two noble gas isotopes, 3.8229 days/54.5 sec. is 6060.5. Even though thorium normally is more abundant in geologic materials than uranium, the very large difference in the half lives of these two noble gas isotopes severely limits the depth of the thoron in the soil at which it is able to diffuse to the surface to between 10 to 20 cm. At greater depths, the thoron decays to its non-gaseous daughter products before it can reach the surface of the soil. The maximum diffusion depth for radon is in meters.

In addition, for thoron even to enter the monitor's ion chamber once it reaches the surface, its residence time in the volume between the surface and the diffusion barrier must be very short. Finally, this very short lived noble gas isotope must pass through the diffusion barrier into the ion chamber, a process which may exceed the remaining available time. The flux monitor provides the user with a selection of diffusion barriers with different diffusion constants. In general, corrections for the drop in voltage due to thoron would be expected to be very small compared to the voltage drop due to even low radon surface flux rates.

A direct consequence of daylight measurement of radon surface flux is that the direct exposure of unprotected hemispheres of the monitors to full sunlight can result in making some hemispheres almost too hot to touch. Surface temperatures in excess of 130 degrees F. have been measured. Electrets so exposed to full sunlight are also warm or hot to the touch. The final electret voltage measurement should not be made until the electret has returned to ambient air temperature. The data on the effect of this temperature rise on the performance of the ion chamber is difficult to establish. Clearly, the pressure inside the hemisphere increases because the leakage rate of the air in the ion chamber through the monitor diaphragms are low. White plastic bag minimize the heating effect. REI has also developed a white plastic hemisphere that can be placed over the black hemisphere that substantially reduces the solar heating effect.

Because radon flux monitors respond both to radon and gamma radiation from what ever source, soil or atmosphere, it is important to establish for the survey area, at the beginning of the field season, the level of the ambient atmospheric radon and the gamma background at the surface of the soil. As the radon surface flux rates rise, the gamma signals from the soil also are expected to rise. This increase in soil gamma background values is due to the decay of the radon which did not reach the surface and to the decay in place of daughter products. The increase in the delta volts produced by the gamma rays is a supporting factor to the delta volts produced in the ion chamber by the decay of the radon from the soil. In many field situations the delta volts from gamma rays is relatively small when compared the delta volts from the decay of the radon in the ion chamber. This gamma contribution to the total delta volts and may be overlooked the total delta volts may be calculated as if it were due only to the radon surface flux. If a question arises concerning the gamma background correction from the soil surface, it can be measured either with portable instrumentation and/or REI ion chambers.

The ambient atmospheric radon measurements are made with the chambers. For adequate chamber voltage drops, ambient atmospheric radon and gamma measurement normally requires two or three days depending on the atmospheric radon levels. As noted above, even for non-equilibrium, relatively low radon surface flux rates, normal radon surface flux measurements typically require only 2 to 6 hours. For such relatively short exposure periods, the combined flux monitor's delta volts corrections for both the normal atmospheric radon and gamma backgrounds would be usually relatively small and are sometimes ignored. However, if it becomes important to use all of the available information in areas where suspected radon signals from an ore deposit might be weak, corrections for the ambient atmospheric radon and gamma background levels could be useful.

While the invention has been described with reference to specific embodiments, modifications and variations of the invention may be constructed without departing from the scope of the invention.

The invention claimed is:

1. A passive ground surface gas flux monitor, comprising:
a chamber having a known volume comprising an open base and an opening where a gas sensor can be attached,
a collar connected to the open base, extending below the circumference of the open base being adapted to be pressed into the ground and that supports the chamber when placed on the ground, and
a foraminous layer connected to the collar above the ground,
whereby an area of ground being measured is clearly defined when the collar is pressed into the ground.

2. The passive ground surface gas flux monitor of claim 1, wherein the chamber is a dome and wherein the foraminous element comprises a conductive screen mounted between the collar and the dome, wherein the conductive screen permits diffusion of radon, thoron, and their daughter products into the dome, and wherein the collar is made of a conductive material.

3. The passive ground surface gas flux monitor of claim 2, further comprising a thin paper diaphragm adjacent the conductive screen.

4. The passive ground surface gas flux monitor of claim 3, wherein the dome further comprises a radial flange on its open base and wherein the collar holds the conductive screen against the radial flange.

5. The passive ground surface gas flux monitor of claim 4, further comprising sealant sealing the collar, flange, and peripheral edges of the screen and diaphragm.

6. The passive ground surface gas flux monitor of claim 1, wherein the gas sensor is a radon decay measuring device.

7. The passive ground surface gas flux monitor of claim 6, wherein the radon decay measuring device is an electrets in an electrets holder which is connected to the opening.

8. The passive ground surface gas flux monitor of claim 1, wherein the dome is made of reflective material or is coated or covered with reflective material to reduce a solar heating effect.

9. The passive ground surface gas flux monitor of claim 1, further comprising a maximum temperature recorder connected to the chamber.

10. A method of measuring ground surface gas flux, comprising:
providing a ground surface gas flux monitor comprising a chamber of known volume, which chamber further comprises an open base and an opening remote from the base where a gas sensor can be attached, a collar extending below the circumference of the open base of the chamber, and a foraminous element supported by the collar,
positioning the ground surface gas flux monitor on the ground and pressing a lower portion of the collar into the ground so that a lower portion of the collar is in the ground and an upper portion of the collar supports the dome above the ground, mounting a gas sensor in the opening, exposing the gas sensor in the chamber, and leaving the gas surface flux monitor on the ground.

11. The method of measuring ground surface gas flux of claim 10, wherein the chamber is a dome, and providing the ground surface gas flux monitor further comprises providing a spent gas sensor or a seal in the opening, further comprising waiting for equilibrium to be achieved between gas in the dome and a ground surface gas flux, removing the spent gas sensor or seal from the opening, and mounting an active gas sensor in the opening, recording the time of mounting the active gas sensor and the location of the ground surface gas flux monitor, exposing the gas sensor to an interior of the dome, removing the exposed gas sensor, recording the time of removing the exposed gas sensor, measuring the exposed element gas sensor, and recording the measurement of the gas sensor.

12. The method of measuring ground surface gas flux of claim 11, wherein the positioning the ground surface gas flux monitor and the removing the exposed gas sensor are done during daylight hours of a single day to avoid condensation within the dome.

13. The method of measuring ground surface gas flux of claim 11, further comprising inspecting and capping or encasing the exposed gas sensor after it is removed from the opening and mounting a spent gas sensor or seal in the opening.

14. The method of measuring ground surface gas flux of claim 11, further comprising inspecting the charged gas sensor after it is removed for the presence of water droplets on its surface, keeping the charged gas sensor horizontal and allowing a short period for the droplets to evaporate when such droplets are discovered.

15. The method of measuring ground surface gas flux of claim 11, further comprising measuring the temperature of the charged gas sensor and waiting for it to return to ambient air temperature before taking a final measurement of the gas sensor.

16. The method of measuring ground surface gas flux of claim 11, further comprising measuring the level of ambient atmospheric radon and the gamma background at the surface of the soil.

17. The method of measuring gas ground surface flux of claim 11, further comprising determining the difference in charge between initial and final voltage readings of the gas sensor, dividing this difference by the exposure time in hours, and using this value as a measure of surface flux.

18. The method of measuring ground surface gas flux of claim 10, wherein the providing a ground surface gas flux monitor with a foraminous element further comprises providing a conductive screen attached to the open base that permits diffusion of gas within the collar into the dome.

19. The method of measuring ground surface gas flux of claim 18, further comprising selecting a diffusion diaphragm with a predetermined diffusion constant and providing it near the conductive screen on the gas surface flux monitor.

20. The method of measuring ground surface gas flux of claim 18, wherein the providing a ground surface gas flux monitor further comprises providing a charged gas sensor in the opening, further comprising recording the time of positioning the gas surface flux monitor and the location of the gas surface flux monitor, removing the charged gas sensor, recording the time of removing the charged gas sensor, measuring the change in charge on the charged gas sensor, and recording change in the charge on the charged gas sensor.

21. The method of measuring ground surface gas flux of claim 10, wherein the positioning the ground surface gas flux monitor comprises pressing the collar into the ground.

22. The method of measuring gas ground surface flux of claim 10, further comprising forming a groove in the ground by pressing or stepping on a depth stop on which a second collar is mounted, wherein the positioning the ground surface gas flux monitor comprises placing the collar into the groove formed in the ground.

23. The method of measuring ground surface gas flux of claim 10, further comprising providing a thin paper diaphragm on the foraminous element, selecting a site for measurement to minimize presence of moisture and objects that could damage or puncture the diaphragm and removing from the site any objects that could damage or puncture the diaphragm.

24. A passive radon surface flux monitor, comprising:

a hemispherical dome comprising an open base, a top threaded opening where an electret can be threaded, and a radial flange on its open base, a cylindrical metal collar connected to the open base and extending below the circumference of the open base of the dome that supports the dome when placed on the ground, a conductive screen attached to the open base, a diaphragm adjacent the conductive screen, and sealant sealing the collar, the flange, and peripheral edges of the screen and the diaphragm, wherein the collar holds the conductive screen against the radial flange, and the conductive screen permits diffusion of ground surface gas including radon, thoron, and their daughter products into the dome.

* * * * *